US012627782B2

(12) United States Patent
Knorr

(10) Patent No.: US 12,627,782 B2
(45) Date of Patent: May 12, 2026

(54) METHOD FOR DERIVING AT LEAST ONE ITEM OF INFORMATION FROM IMAGES OF A STEREO CAMERA

(71) Applicant: Robert Bosch GmbH, Stuttgart (DE)

(72) Inventor: Moritz Michael Knorr, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 473 days.

(21) Appl. No.: 18/152,891

(22) Filed: Jan. 11, 2023

(65) Prior Publication Data

US 2023/0231981 A1 Jul. 20, 2023

(30) Foreign Application Priority Data

Jan. 18, 2022 (DE) ...................... 10 2022 200 542.2

(51) Int. Cl.
| | |
|---|---|
| *H04N 13/106* | (2018.01) |
| *G06T 3/18* | (2024.01) |
| *G06T 7/246* | (2017.01) |
| *G06T 7/593* | (2017.01) |
| *G06V 20/56* | (2022.01) |
| *H04N 13/00* | (2018.01) |

(52) U.S. Cl.
CPC ............. *H04N 13/106* (2018.05); *G06T 3/18* (2024.01); *G06T 7/246* (2017.01); *G06T 7/593* (2017.01); *G06V 20/56* (2022.01); *G06T 2207/30252* (2013.01); *H04N 2013/0081* (2013.01)

(58) Field of Classification Search
None
See application file for complete search history.

(56) References Cited

U.S. PATENT DOCUMENTS

| | | | | |
|---|---|---|---|---|
| 2012/0307155 A1* | 12/2012 | Gleicher | ................... | G06T 3/18 |
| | | | | 348/580 |
| 2014/0198184 A1* | 7/2014 | Stein | ...................... | H04N 23/69 |
| | | | | 348/47 |
| 2021/0026355 A1* | 1/2021 | Chen | ...................... | G01S 17/89 |
| 2025/0029401 A1* | 1/2025 | Gomezcaballero | ...... | G08G 1/16 |

FOREIGN PATENT DOCUMENTS

| | | |
|---|---|---|
| DE | 102012014994 A1 | 1/2014 |
| EP | 1580092 A2 | 9/2005 |

OTHER PUBLICATIONS

Pault et al., "Alternating-Stereo Vins: Observability Analysis and Performance Evaluation," 2018 IEEE/CVF Conference on Computer Vision and Pattern Recognition, IEEE Computer Society, 2018, pp. 4729-4737. (Year: 2018).*
Paul et al., "Alternating-Stereo Vins: Observability Analysis and Performance Evaluation," 2018 IEEE/CVF Conference on Computer Vision and Pattern Recognition, IEEE Computer Society, 2018, pp. 4729-4737.

* cited by examiner

*Primary Examiner* — Stuart D Bennett
(74) *Attorney, Agent, or Firm* — NORTON ROSE FULBRIGHT US LLP

(57) ABSTRACT

A method for deriving at least one item of information from images of a stereo camera. A resource-saving and at the same time accurate derivation of information from the images is achieved by alternately using and processing the images with methods of monocular image processing and deriving at least one item of information from the results. A motor vehicle comprising a stereo camera and comprising a control device which carries out the method, are also described.

10 Claims, 3 Drawing Sheets

METHOD FOR DERIVING AT LEAST ONE ITEM OF INFORMATION FROM IMAGES OF A STEREO CAMERA

CROSS REFERENCE

The present application claims the benefit under 35 U.S.C. § 119 of German Patent Application No. DE 10 2022 200 542.2 filed on Jan. 18, 2022, which is expressly incorporated herein by reference in its entirety.

FIELD

The present invention relates to a method for deriving at least one item of information from images of a stereo camera. The invention also relates to a motor vehicle comprising a stereo camera and a control device for carrying out the method.

BACKGROUND INFORMATION

In many applications, it is desirable to obtain information about the current environment of the application. One such application is a motor vehicle, for example. For this purpose, at least one camera which captures images of the environment of the application during operation can be used. Information is then derived from the images. Depth estimation in particular is of special interest here, because it is important for driving assistance, for example, and/or for at least partially autonomous driving of motor vehicles.

The use of a single camera for this purpose is available in the related at. In monocular systems, information is derived from the images of the camera by processing the successive images of the camera using methods for monocular image processing.

The use of a stereo camera comprising two cameras is available for this purpose as well, wherein the respective camera captures associated images. In the corresponding stereo methods, the new images of both cameras are used and processed at each point in time. In particular the stereo disparity between simultaneously captured images and/or an optical flow between successively captured images is determined. This allows improved depth estimation and improved detection of self-moving objects.

Corresponding systems and methods are described, for example In German Patent Application No. DE 10 2012 014 994 A1 and European Patent Application No. EP 1 580 092 A2.

The monocular systems and methods in particular have the disadvantage that a depth estimation for self-moving objects is not possible or is subject to high error rates. The stereo systems and methods in particular have the disadvantage that the processing of the images involves a high consumption of resources.

SUMMARY

The present invention has an object of providing improved or at least different embodiments for a method for deriving at least one item of information from images of a stereo camera and for a motor vehicle comprising such a stereo camera, which in particular may eliminate disadvantages from the related art.

This object may be achieved according to features of the present invention. Advantageous embodiments of the present invention are disclosed herein.

The present invention includes alternately using and processing the images captured by cameras of a stereo camera at successive points in time in order to derive information from the images. Therefore, at each successive point in time a new image has to be taken into account. This means that methods designed for monocular processing are applied to an alternating image sequence of a stereo camera. Compared to the stereo methods available in the related art, this results in a considerable reduction of required resources. This in particular saves bandwidths and/or memory and/or the consumption of electrical energy. This in particular avoids the calculations of disparities between simultaneously captured stereo images and/or calculations of the change over time between pairs of successive images which are usually necessary in stereo methods. Compared to stereo methods, the solution according to the invention further offers the advantage that two different methods, in particular algorithms, are not required. Compared to monocular systems available in the related art, there can be no linear movement of the cameras at successive points in time. As a result, improved information can be derived from the environment, in particular from objects moving in parallel. Compared to monocular systems, there is furthermore the advantage that a pseudo movement can be determined even when stationary, which can be advantageous for a depth estimation. Another advantage over monocular systems is that, due to the usually known distance between the two cameras of the stereo camera, there is a fixed reference value that, for example, makes it possible to eliminate or at least reduce the problem of scale ambiguity of monocular systems.

In accordance with an example embodiment of the present invention, in a step which hereinafter is also referred to as a monocular step, the images of the first camera and the second camera are used and processed with methods of monocular image processing alternately in terms of time and output as results in order to derive at least one item of information from images of a stereo camera comprising a first camera and a second camera. In a step, which hereinafter is also referred to as a derivation step, at least one item of information is derived from the results of the monocular step.

During operation, the first camera captures first images and the second camera captures second images. In the monocular step, therefore, the first images and the second images are alternately used and processed with methods of monocular image processing.

The stereo camera advantageously has properties typical of stereo cameras. The cameras are in particular similarly aligned and have overlapping fields of view, in particular similar fields of view. The cameras in particular have an intrinsic alignment. Thus, compared to a stereo method, a high-precision extrinsic alignment and calibration of the cameras can be omitted or at least carried out to a lesser extent; in particular since the cameras comprise an intrinsic calibration and/or rectification. This requirement can essentially also be achieved with image preprocessing.

It is preferable if the distance between the cameras is known and is taken into account in the method. This leads to improved accuracy in both the monocular step and the derivation step.

The method can be simplified if both cameras are alike, in particular identical.

"Methods of monocular image processing" is in particular intended to be understood here as processing the images in such a way that, compared to a stereo method, the successive images of the two cameras are not used simultaneously but rather that the images of the first camera and the second camera are used alternately. Consequently, only one new image has to be processed at each point in time.

The monocular step can include any methods of monocular image processing.

Advantageously, in the monocular step, an optical flow of the alternately used first images and second images is determined and output as a result.

According to an example embodiment of the present invention, it is preferable if, in the monocular step, at least one image feature of the alternately used first images and second images is tracked over time and output as a result.

Alternatively or additionally, monocular deep learning methods can be used in the monocular step.

The derivation step can be used to derive any information from the results of the monocular step.

Preferably, information for depth estimation is derived in the derivation step.

In advantageous embodiments of the present invention, at least one monocular method for deriving at least one of the at least one item of information is used in the derivation step. The resources required in the derivation step are thus reduced as well.

According to an example embodiment of the present invention, preferably, a movement of the stereo camera itself is derived as information in the derivation step.

According to an example embodiment of the present invention, preferably, an adjustment is made when the self-movement is derived. The, preferably known, offset between the cameras can be taken into account. If the result of a previously determined self-movement is assumed for the self-movement, the offset has to be taken into account twice, i.e. added or subtracted, in particular because the direction has to be reversed.

Alternatively or additionally, the derivation step can include warping. Advantageously, images and/or depth measurement values and/or predications and/or features and/or certainties are warped, preferably in accordance with a depth map and/or another type of predication which can be both forward and backward in time.

In advantageous embodiments of the present invention, the estimation of depths and/or the detection of objects, in particular self-moving objects in the environment of the stereo camera are derived as information in the derivation step. Changes in the image can be estimated as well.

According to an example embodiment of the present invention, a computer program product, for example an algorithm and/or a software, which is appropriately configured, is advantageously used to carry out the method according to the present invention.

The method according to the present invention can be carried out by means of a computer system. The computer system is in particular configured in such a way that, during operation, it executes the computer program product in order to carry out the method.

In principle, the method can be used in any applications.

The method is advantageously used in a motor vehicle. The motor vehicle thus comprises the stereo camera. The motor vehicle further comprises a control device for carrying out the method, which is configured accordingly. In other words, the control device is configured in such a way that it derives at least one item of information from the images of the stereo camera according to the method.

The control device can comprise the computer system and/or be a component of the computer system. The control device can in particular at least partially include the computer program product.

The at least one derived item of information is advantageously made available to a driving assistance system of the motor vehicle. The driving assistance system is configured to assist an operator and/or for at least partially autonomous driving of the motor vehicle, wherein the driving assistance system takes the at least one item of information into account for this purpose.

According to an example embodiment of the present invention, the stereo camera is advantageously disposed in the motor vehicle in such a way that it captures images in the front area of the motor vehicle when the motor vehicle is traveling forward. The reliability of the driving assistance system can thus be increased. The stereo camera can in particular be mounted on a windshield of the motor vehicle.

Compared to a monocular system, the method according to the present invention may further offer the advantage that the two cameras of the stereo camera can also be used for initialization and/or reinitialization with a known self-movement. A reinitialization can in particular be carried out when the method and/or the stereo camera and/or the motor vehicle is started, or after an error has been detected or in the event of an implausible result. For this purpose, in deviation from the above-described method for deriving the information, simultaneously captured images can be taken into account. It is possible to use stereo methods for initialization or reinitialization. It is in particular possible to circumvent or suspend the derivation of the self-movement and assume a respective ground truth if the relative position between the cameras is known with sufficient accuracy. Reinitialization can be used, in particular periodically, for validation.

Sources of said errors which can make initialization or reinitialization necessary, are, for example, high speeds at which very much changes in the successive images and/or the brief failure of at least one of the cameras and/or a brief occlusion of at least one of the cameras, for example due to rain or debris, or a decalibration of at least one of the cameras.

Further main features and advantages of the present invention will emerge from the disclosure herein, including from the figures and from the associated description of the figures.

It goes without saying that the aforementioned features and the features yet to be explained in the following can be used not only in the respectively specified combination, but also in other combinations or on their own, without leaving the scope of the present invention.

Preferred embodiment examples of the present invention are shown in the figures and will be explained in more detail in the following description, wherein the same reference numbers refer to the same or similar or functionally the same components.

DETAILED DESCRIPTION OF EXAMPLE EMBODIMENTS

Figure 1:
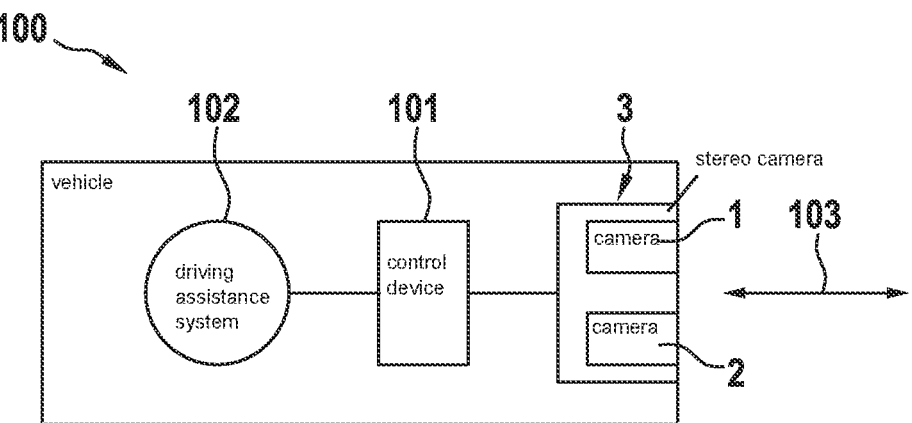
FIG. 1 shows a greatly simplified circuit diagram-like illustration of a stereo camera in a motor vehicle.
Figure 2:
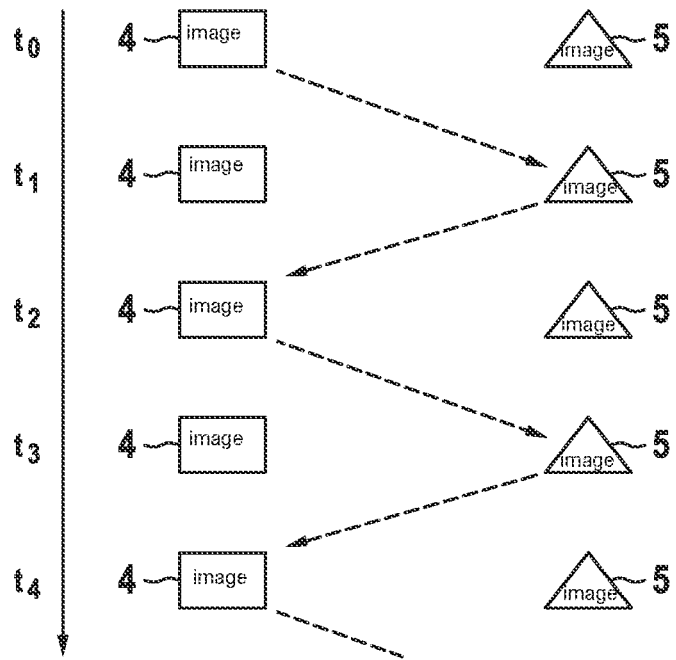
FIG. 2 shows a symbolic illustration of images captured with the stereo camera.
Figure 4:
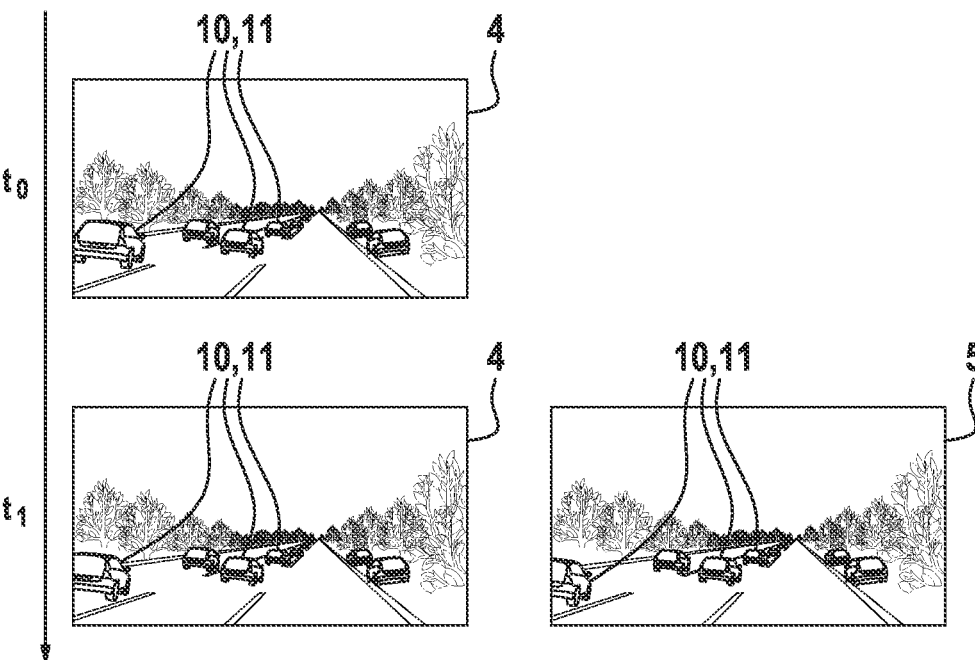
FIG. 4 shows images of the camera.

A stereo camera 3 comprising a first camera 1 and a second camera 2, as shown greatly simplified in FIG. 1, is in particular used in a motor vehicle 100, as shown as an example and greatly simplified and in the manner of a circuit diagram in FIG. 1. During operation, the first camera 1 captures first images 4 and the second camera 2 captures second images 5. The images 4, 5 are shown in FIG. 2, wherein the first images 4 are shown symbolically as rect- angles and the second images 5 as triangles. In FIG. 4, examples of images 4, 5 are shown greatly simplified.

As is typical for stereo cameras, the two cameras 1, 2 have an intrinsic alignment to one another, wherein the distance between the cameras 1, 2 is preferably known and is taken into account in the method described in the following. The cameras 1, 2 furthermore have an at least similar alignment and similar overlapping fields of view. The cameras 1, 2 are preferably also configured in the same way, in particular identically.

Figure 3:
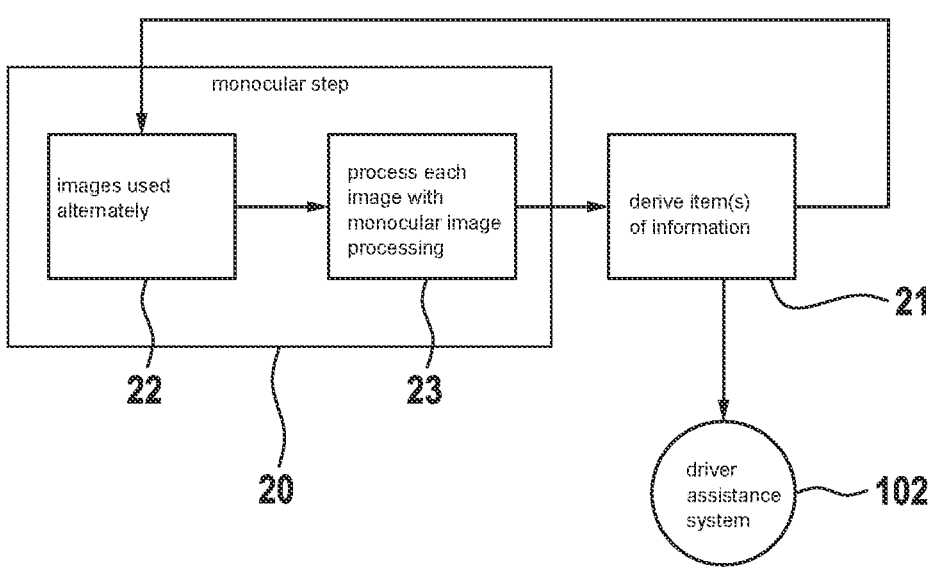
FIG. 3 shows a flow chart to explain a method for deriving at least one item of information from images of the stereo camera, according to an example embodiment of the present invention.

As indicated in FIG. 2 and shown as an example by the flow chart in FIG. 3, at least one item of information, in particular about the environment of the stereo camera 3 and thus the motor vehicle 100, is derived from the images 4, 5. For this purpose, the first images 4 and the second images 5 are used alternately and processed with methods of mon- ocular image processing. A time axis is shown as an arrow in FIG. 2. In the shown example, therefore, both cameras 1, 2 respectively capture successive images 4, 5. In other words, at successive points in time tN, wherein N is a natural number greater than or equal to 0, the first camera 1 captures a first image 4 and the second camera 2 captures a second image 5. As indicated in FIG. 2 with dashed lines, not both captured images 4, 5 are used at the points in time tN; rather a first image 4 of the first camera 1 and a second image 5 of the second camera 2 are alternately used and processed with methods of monocular image processing.

According to the flow chart shown in FIG. 3, this is carried out in a step 20, which hereinafter is also referred to as a monocular step 20. In the monocular step 20, therefore, the first images 4 and the second images 5 are alternately used and processed with methods of monocular image processing. A new image 4, 5 is thus processed at each point in time tN. Compared to stereo methods available in the related art (not shown), in which both new images 4, 5 have to be processed at each point in time tN, this results in a significant reduction in the required resources.

The result of this image processing is transmitted to a subsequent step 21. In the step 21, at least one item of information is derived from results of the monocular step 20. The step 21 is also referred to hereinafter as the derivation step 21.

As can further be seen in FIG. 3, the monocular step 20 in the shown embodiment example includes a step 22, in which the images 4, 5 are used alternately as described, and a step 23, in which the respective currently being used image 4, 5 is processed with methods of monocular image pro- cessing. The step 22 is hereinafter also referred to as alternating step 22 and the step 23 is referred to as the processing step 23. As can further be seen in FIG. 3, after the derivation step 21, the method can return to the monocular step 20, in particular the alternating step 22.

Figure 5:
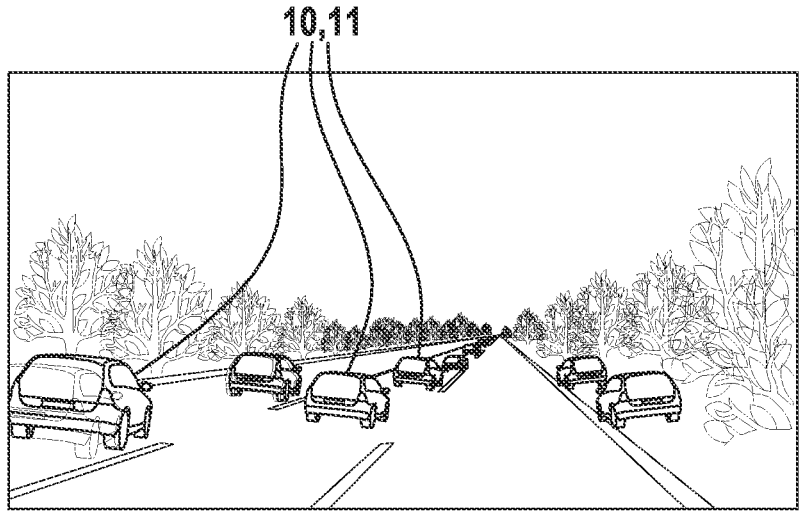
FIG. 5 shows a difference between images of FIG. 4 according to the related art.

The advantages of the method according to the invention over a monocular system consisting of only one camera are explained in the following with reference to FIGS. 4 to 6 as examples.

FIG. 4 shows the time axis with an arrow, wherein images 4, 5 are shown at two successive points in time t0 and t1. Images 4 of the first camera 1, which can be a left camera 1, for example, are shown at both points in time t0, t1, and an image 5 of the second camera 2, which can be a right camera 2, for example, is shown at the point in time t1. If only one camera 1, 2 were provided, the system would be a monocular system. In the following, it is assumed purely as an example that the monocular system consists of the first camera 1. This results in the difference indicated in FIG. 5 between the first images 4 of the monocular system con- sisting of the first camera 1 which are captured at the point in time t0 and t1. The method according to the invention, on the other hand, is used to create the difference between the first image 4 captured by the first camera 1 at the point in time t0 and the second images 5 captured by the second camera 2 at time t1, as indicated as an example in FIG. 6. As a comparison between FIGS. 5 and 6 shows, the difference in FIG. 6 and thus in the method according to the invention is significantly more pronounced than the difference in FIG. 5 and thus according to the related art. The method accord- ing to the invention therefore makes it possible to derive information from the images 4, 5 more reliably, more accurately and in a significantly simplified manner. It is in principle also possible to capture only one image 4, 5 with the camera 1, 2 relevant to the time tN at any time tN.

Figure 6:
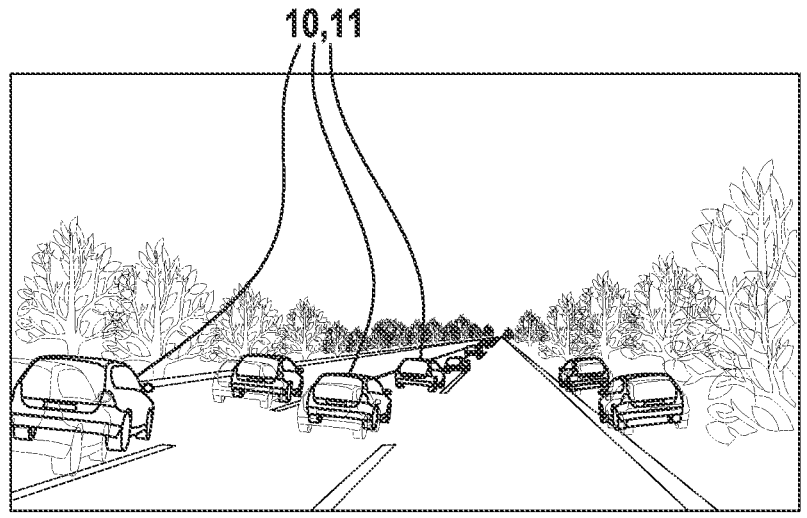
FIG. 6 shows a difference between images of FIG. 4 according to the present invention.

The monocular step 20, in particular the processing step 23, preferably includes determining an optical flow from the alternately used first images 4 and second images 5, i.e. similar to the difference shown in FIG. 6. Alternatively or additionally, monocular deep learning methods are used in the monocular step 20, in particular in the processing step 21.

Advantageously, at least one monocular method for deriv- ing at least one of the at least one item of information is used in the derivation step 21.

In the derivation step 21, for example, a movement of the stereo camera 3 itself and thus of the motor vehicle 100 is derived as information. Alternatively or additionally, the derivation step 21 can include warping. This involves, for example, warping the images 4, 5, depth measurement values, predications, features or certainties, preferably in accordance with a depth map and another type of predication which can be both forward and backward in time. The derivation step 21 alternatively or additionally includes the estimation of depths and/or the detection of objects 10 (see FIG. 4), in particular self-moving objects 11, in the envi- ronment of the stereo camera 3 and thus the motor vehicle 100 as derived information. The derivation step 21 can also include estimating a change in the images 4, 5 as informa- tion.

As indicated in FIGS. 1 and 3, the at least one derived item of information can be provided to a driving assistance system 102 of the motor vehicle 100. The driving assistance system 102 is configured to provide assistance when driving the motor vehicle 100 and/or for at least partially autono- mous driving of the motor vehicle 100, wherein the driving assistance system 102 takes the at least one derived item of information into account for this purpose.

As can be seen in FIG. 1, for carrying out the method, the motor vehicle 100 comprises a control device 101 which is connected to the stereo camera 3 and is configured accord- ingly. The control device 101 can comprise a not depicted computer system, for example, or it can be a component of the computer system. The control device 101 or the computer system can include an appropriately configured computer program product for carrying out the method.

In the embodiment example shown in FIG. 1, the stereo camera 3 is mounted in the front in a Z-direction 103 of the motor vehicle 100, for example on a not depicted windshield. Thus, during operation, the cameras 1, 2 capture images 4, 5 from the front area, in particular from the front area in the forward direction of travel, of the motor vehicle 100. In a driving situation shown in FIG. 4, objects 10, such as self-moving objects 11, can be captured in the images 4, 5 as explained above and their depths, in particular their relative position to the stereo camera 3 and consequently to the motor vehicle 100, can be derived.

What is claimed is:

1. A method for deriving at least one item of information from images of a stereo camera including a first camera and a second camera, the method comprising the following steps:

capturing, at successive points in time, first images from the first camera, and second images from the second camera;

in a monocular step, processing only a single new image at each respective point in time, wherein the single new image is selected alternately from the captured first images and second images to generate a time-alternating sequence of processed images using methods of monocular image processing, and outputting results of the monocular step including the time-alternating sequence of processed images; and in a derivation step, deriving at least one item of information from the results of the monocular step including the time-alternating sequence of processed images.

2. The method according to claim 1, wherein in the monocular step, an optical flow of the single new image processed at each respective point in time, that is selected alternately from the captured first images and second images, is determined and output as a result.

3. The method according to claim 1, wherein, in the monocular step, at least one image feature of the single new image processed at each respective point in time, that is selected alternately from the captured first images and second images, is tracked over time and output as a result.

4. The method according to claim 1, wherein monocular deep learning methods are used in the monocular step.

5. The method according to claim 1, wherein at least one monocular method for deriving at least one of the at least one item of information is used in the derivation step.

6. The method according to claim 1, wherein, in the derivation step, a movement of the stereo camera itself is derived as information.

7. The method according to claim 1, wherein the derivation step includes warping.

8. The method according to claim 1, wherein the derivation step derives an estimation of depths and/or detection of self-moving objects, in an environment of the stereo camera as information.

9. A non-transitory computer-readable storage medium on which is stored a computer program for deriving at least one item of information from images of a stereo camera including a first camera and a second camera, the computer program, when executed by a computer, causing the computer to perform the following steps:

capturing, at successive points in time, first images from the first camera, and second images from the second camera;

in a monocular step, processing only a single new image at each respective point in time, wherein the single new image is selected alternately from the captured first images and second images to generate a time-alternating sequence of processed images using methods of monocular image processing, and outputting results of the monocular step including the time-alternating sequence of processed images; and in a derivation step, deriving at least one item of information from the results of the monocular step including the time-alternating sequence of processed images.

10. A motor vehicle, comprising:

a stereo camera including a first camera which captures first images during operation, and a second camera which captures second images during operation, wherein the first images and the second images are captured at successive points in time; and a control device configured to derive at least one item of information from the captured first and second images of the stereo camera, the control device configured to:

in a monocular step, process only a single new image at each respective point in time, wherein the single new image is selected alternately from the captured first images and second images to generate a time-alternating sequence of processed images using methods of monocular image processing, and output results of the monocular step including the time-alternating sequence of processed images; and in a derivation step, derive at least one item of information from the results of the monocular step including the time-alternating sequence of processed images.

* * * * *